United States Patent
Said

(10) Patent No.: US 7,225,694 B2
(45) Date of Patent: Jun. 5, 2007

(54) TELESCOPIC ACTUATOR

(75) Inventor: Brian R. Said, Jupiter, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 615 days.

(21) Appl. No.: 10/771,716

(22) Filed: Feb. 5, 2004

(65) Prior Publication Data

US 2004/0173041 A1    Sep. 9, 2004

Related U.S. Application Data

(60) Provisional application No. 60/450,667, filed on Mar. 3, 2003.

(51) Int. Cl.
*F16H 27/02*    (2006.01)

(52) U.S. Cl. .................... 74/89.35; 74/89.37
(58) Field of Classification Search ............ 74/89.35, 74/89.37, 89.38, 89.39
See application file for complete search history.

(56) References Cited

U.S. PATENT DOCUMENTS

| | | | |
|---|---|---|---|
| 1,705,232 A | | 3/1929 | Brantingson |
| 2,674,453 A | * | 4/1954 | Hummert ................ 49/355 |
| 4,062,156 A | * | 12/1977 | Roth ..................... 52/111 |
| 4,651,581 A | * | 3/1987 | Svensson ................ 74/89.35 |
| 4,793,197 A | * | 12/1988 | Petrovsky ............... 74/89.35 |
| 5,035,094 A | | 7/1991 | Legare |
| 5,128,688 A | | 7/1992 | West |
| 5,282,593 A | | 2/1994 | Fast |
| 5,333,422 A | | 8/1994 | Warren |
| 5,593,129 A | | 1/1997 | Adams et al. |
| 5,660,495 A | | 8/1997 | Atsukawa |
| 5,848,554 A | * | 12/1998 | Kober et al. ............ 74/89.35 |
| 5,937,699 A | | 8/1999 | Garrec |
| 6,026,970 A | | 2/2000 | Sturm et al. |
| 6,299,336 B1 | | 10/2001 | Hulse |
| 6,382,039 B1 | * | 5/2002 | Choi ..................... 74/89.35 |
| 6,435,048 B1 | | 8/2002 | Zimmerman |
| 6,494,005 B2 | | 12/2002 | Zimmerman |
| 6,880,416 B2 | * | 4/2005 | Koch .................... 74/89.35 |
| 2003/0183027 A1 | * | 10/2003 | Koch .................... 74/89.35 |

FOREIGN PATENT DOCUMENTS

DE          0488990 A1     1/1992

* cited by examiner

*Primary Examiner*—David M. Fenstermacher
(74) *Attorney, Agent, or Firm*—Mark A. Wurm; David D'Zurilla

(57) ABSTRACT

A telescopic actuator has a lead screw and one or more concentric or tiered screws. Each screw has one or more tangential interference stop features such as stop cogs. As the lead screw is rotated, it translates out of the concentric screws. As the lead screw reaches its maximum extension, a tangential interference stop feature on the lead screw tangentially contacts a tangential interference stop feature on the concentric screw with which the lead screw is threadably engaged. Upon tangential contact, the associated concentric screw rotates in unison with the lead screw. When there are additional concentric screws, as each concentric screw reaches its maximum extension, the system of tangential contacting of tangential interference stop features causes the other concentric screws to extend out in sequential fashion.

21 Claims, 4 Drawing Sheets

TELESCOPIC ACTUATOR

RELATED APPLICATION

This application claims the benefit under 35 U.S.C. §119(e) of U.S. Provisional Application No. 60/450,667 filed Mar. 3, 2003, the teachings of which are herein incorporated by reference thereto.

FIELD OF THE INVENTION

The present invention relates to telescopic actuators.

SUMMARY OF THE INVENTION

The present invention is a telescopic actuator. It has a lead screw and one or more concentric (when compressed) or tiered (when extended) screws. Each screw in the actuator has either inner threads, outer threads, or both inner and outer threads. The threads can run the entire length of a screw, or can be cut only on a portion of a screw. Each screw also has one or more tangential interference stop features, such as a stop cog. The tangential interference stop features may be positioned at any point along the length of a screw.

From a fully collapsed state, one lead screw, either innermost or outermost, is rotated so that it translates out of the other collapsed screws of the actuator. At a certain point of the extension, a stop cog on the lead screw tangentially contacts a stop cog located on the first concentric screw. Upon tangential contact, the first concentric screw rotates in unison with the lead screw and translates out of any other concentric screws of the actuator. Upon complete extension of the first concentric screw, a stop cog on the first concentric screw tangentially contacts a stop cog on the next concentric screw. This cycle is repeated until each concentric or tiered screw is translated outward. The telescopic actuator can be a linear drive actuator and can be used for antennas, surgical implements, tools, aviation and vehicular controls, and any application that requires an extendible arm or device.

It is therefore an object of a preferred embodiment of the present invention to extend a telescopic actuator through tangential contact of tangential interference stop features.

DETAILED DESCRIPTION OF THE INVENTION

Figure 1:
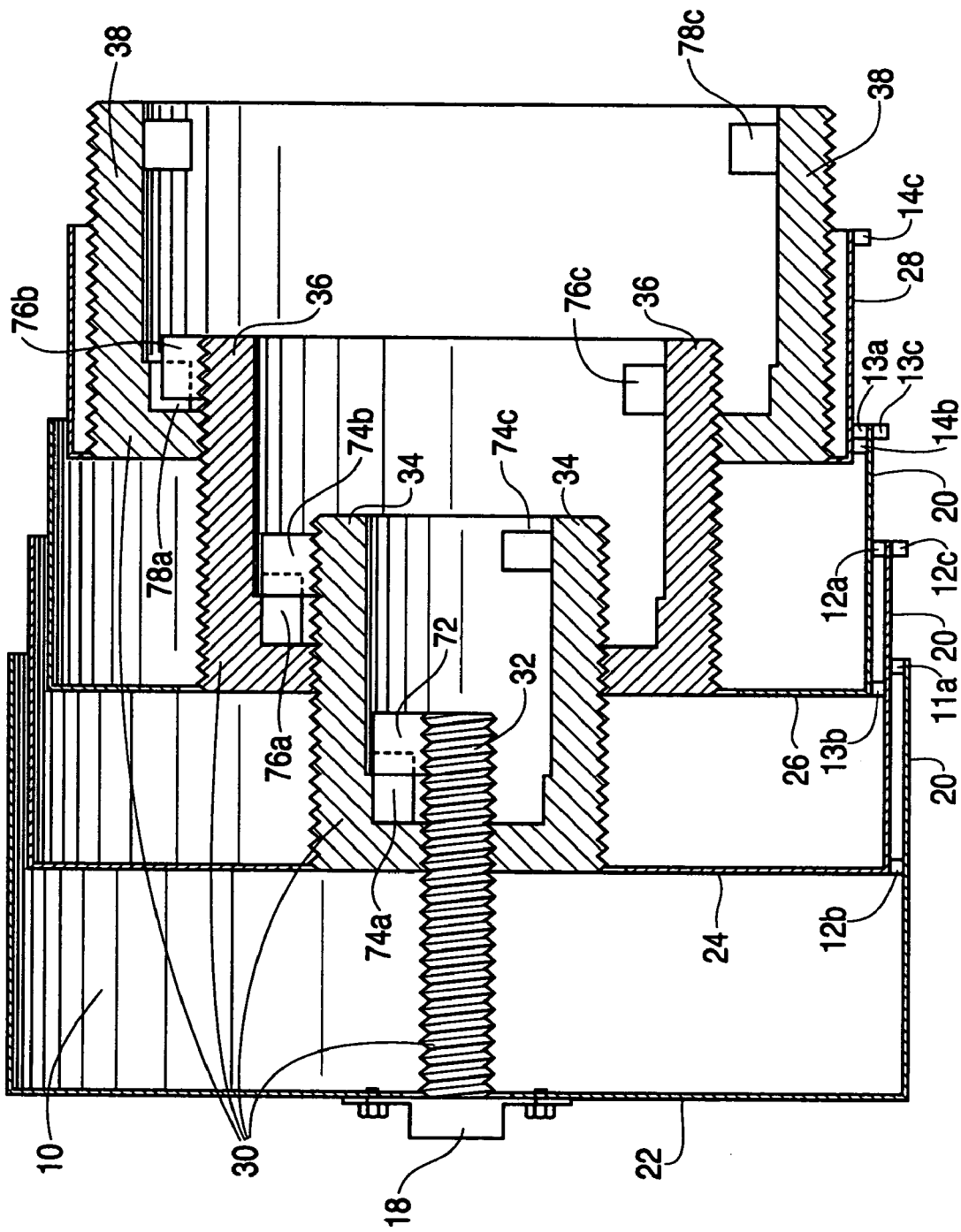
FIG. 1 is a longitudinal section of one embodiment of the present invention.

The present invention is a telescopic actuator, a preferred embodiment of which is illustrated in FIG. 1.

Referring to FIG. 1, the telescopic actuator 10 of the present invention has housing 20. Housing 20 is telescopic in nature, and in the embodiment illustrated in FIG. 1, has tubular walls 22, 24, 26 and 28. While four housing walls are illustrated in FIG. 1, more could be employed as the need arises. The housing walls 22, 24, 26, and 28 are rotatably keyed to each other, such that each housing segment translates relative to its adjacent segment. A grounding bracket 18 is attached to one end of the actuator 10 to prevent that end of the actuator from turning. Also, idler stops 11a; 12a, 12b and 12c; 13a, 13b and 13c; and 14b and 14c are attached to the inner and outer walls of the housing segments to mark the position of minimum compression and maximum extension of the actuator. That is, idler stops 11a, 12a, 12b, 12c, 13a, 13b, 13c, 14b and 14c function as longitudinal limit stops which preserve a limited portion of overlapping sleeved engagement between the housing segments. The housing walls 22, 24, 26 and 28 can telescope down to a minimal length equal to the length of the largest housing segment, or telescope out to a maximum length substantially equal to the sum of the lengths of all the housing segments. FIG. 1 shows the actuator 10 substantially extended out to its maximum length. The orientation of housing 20 can be an initial female segment from which successive male segments telescope out of and back into as illustrated in FIG. 1, or an initial male segment from which successive female segments telescope off of and back onto. Whether the actuator 10 functions as male to female or female to male depends on which screw segment initiates the turning of the actuator. The housing segments 22, 24, 26 and 28 are machined so that they easily slide out of and back into, or off of and back onto, their respective mating segments.

Contained within housing 20 is telescoping threaded screw 30. Threaded screw 30 consists of threaded tiers or segments 32, 34, 36, and 38. As with the housing 20, while four threaded segments are illustrated in FIG. 1, many more segments could be used depending upon the application.

Figure 4:
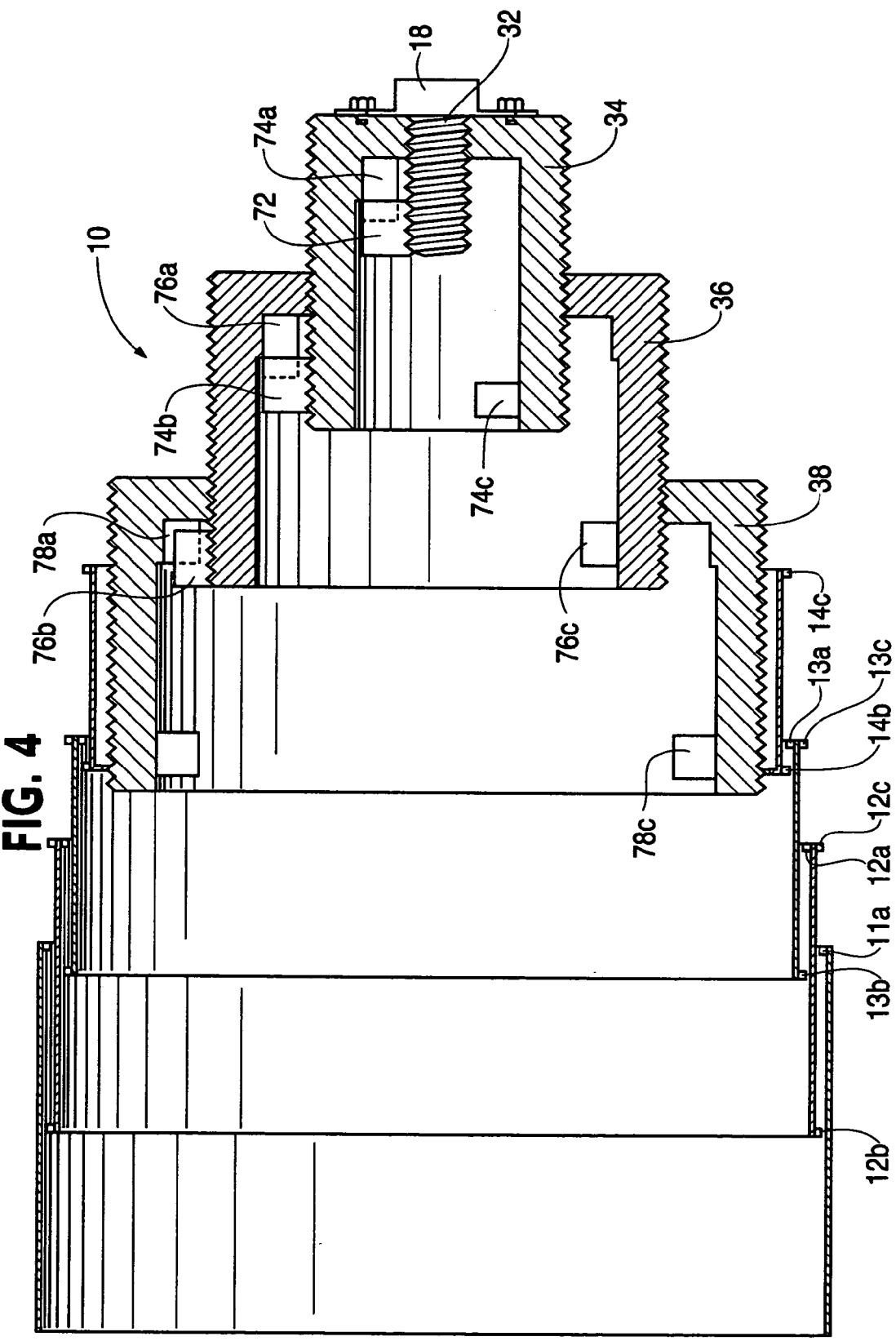
FIG. 4 is a longitudinal section of another embodiment of the present invention.

The screw segments 32, 34, 36, and 38 can progress from male to female connections as shown in FIG. 1 (i.e. male screw 32 connecting with female end of screw 34, male end of screw 34 connecting with female end of screw 36, and so on), or from female to male connections. Additionally, housing segments that initiate with a male segment and progress and translate outward from within female segments can be combined with a threaded screw that begins with a female segment that translates off male segments. Similarly, housing segments that initiate with a female segment and progress and extend off male segments can be combined with a threaded screw that begins with a male segment and progresses out from female segments. (See FIG. 4). Moreover, both the housing and screw can initiate with a female segment and telescope off a male segment, or both can start with a male segment and telescope out from a female segment.

Segments 32, 34, 36, and 38 in FIG. 1 may be threaded along their entire length, or threaded on only a portion of the segment. Threading only a portion of a segment saves on machining costs, especially for the interior threads which are more difficult to cut than the threads on the outside diameter of a segment. The actuator 10 will extend to its maximum length with only partial threading if the mating threads that the partial threads engage run the entire length of the segment. Therefore, if partially threaded and fully threaded segments are cut in an alternating manner, the actuator can extend to its maximum length.

Figure 2:
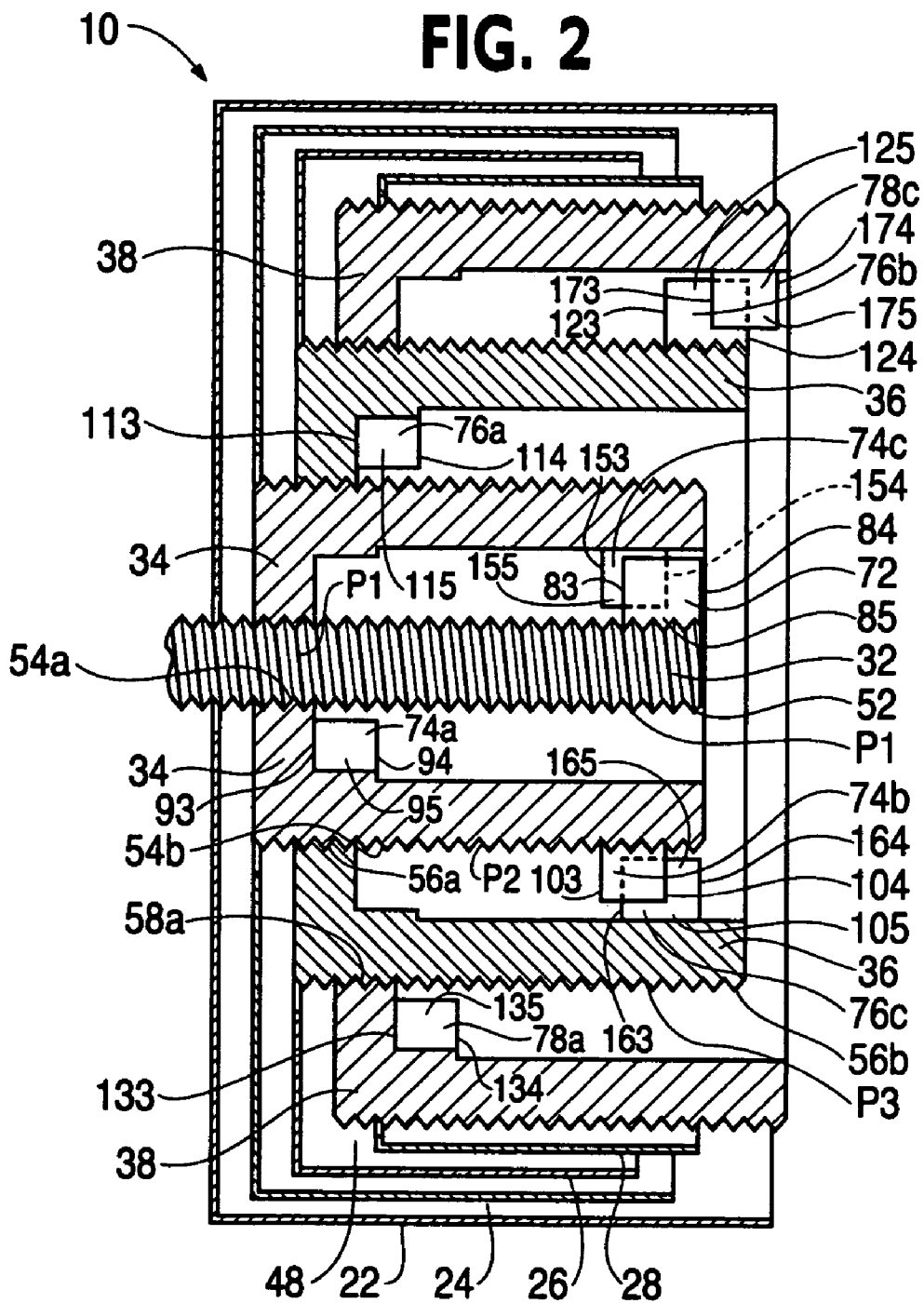
FIG. 2 is a longitudinal section of the embodiment of FIG. 1 in a fully collapsed state.

FIG. 2 is a longitudinal section of the actuator 10 in a fully collapsed state. Specifically, FIG. 2 illustrates threaded screw 32 with threads 52 that form a pitch P1. Attached to threaded screw 32 is a stop cog 72. Stop cog 72 can be attached at the distal end of screw 32, or anywhere along the threads 52. Stop cog 72 has longitudinal faces 83 and 84 that are perpendicular to the axis of screw 32 and transverse faces 85 and 86 (not visible in FIG. 2) that are parallel to the axis of screw 32. Placing the stop cog 72 along the mid-point of the screw 32 will shorten the distance that the actuator 10 telescopes. While this will shorten the maximum extension of the actuator 10, the strength of the extended actuator will be increased because of the double walls formed by the partially extended screw segments.

FIG. 2 further illustrates threaded screw 34 which contains inner threads 54a that form pitch P1 so that threads 52 of screw 32 mate with inner threads 54a of screw 34 in a male to female connection. Screw 34 further contains outer threads 54b, forming a pitch P2. Outer threads 54b form the male connection for inner threads 56a (which also form a pitch P2) on the next screw segment 36. Attached to screw 34 are stop cogs 74a and 74c which are attached to the interior surface of screw 34 at the proximal and distal ends respectively, and stop cog 74b which is attached to outer threads 54b. Stop cog 74a has longitudinal faces 93 and 94, and transverse faces 95 and 96 (not visible in FIG. 2). Stop cog 74c has longitudinal faces 153 and 154, and transverse faces 155 and 156 (not visible in FIG. 2). Similarly, stop cog 74b has longitudinal faces 103 and 104, and transverse faces 105 and 106 (not visible in FIG. 2).

Screw 36 has exterior threads 56b, forming a pitch P3, which engage with the inner threads 58a (also forming pitch P3) of screw 38. Screw 36 also has stop cogs 76a, 76b, and 76c, with longitudinal faces 113 and 114, 123 and 124, and 163 and 164, and transverse faces 115 and 116 (not visible in FIG. 2), 125 and 126 (not visible in FIG. 2), and 165 and 166 (not visible in FIG. 2). Screw 38, the terminal screw segment in this embodiment, has stop cog 78a with longitudinal faces 133 and 134, and transverse faces 135 and 136 (not visible in FIG. 2), and stop cog 78c with longitudinal faces 173 and 174, and transverse faces 175 and 176 (not visible in FIG. 2). It should be noted that the pitches of the different screw segments may all be equal. Alternatively, some screw segments may have different pitches than others. Different pitches will not affect the function of the invention as long as the mating pitches are equal. While the embodiment just described has four screw segments 32, 34, 36 and 38, as explained earlier, more threaded segments could be added onto the screw 30 if the need arose.

Figure 3:
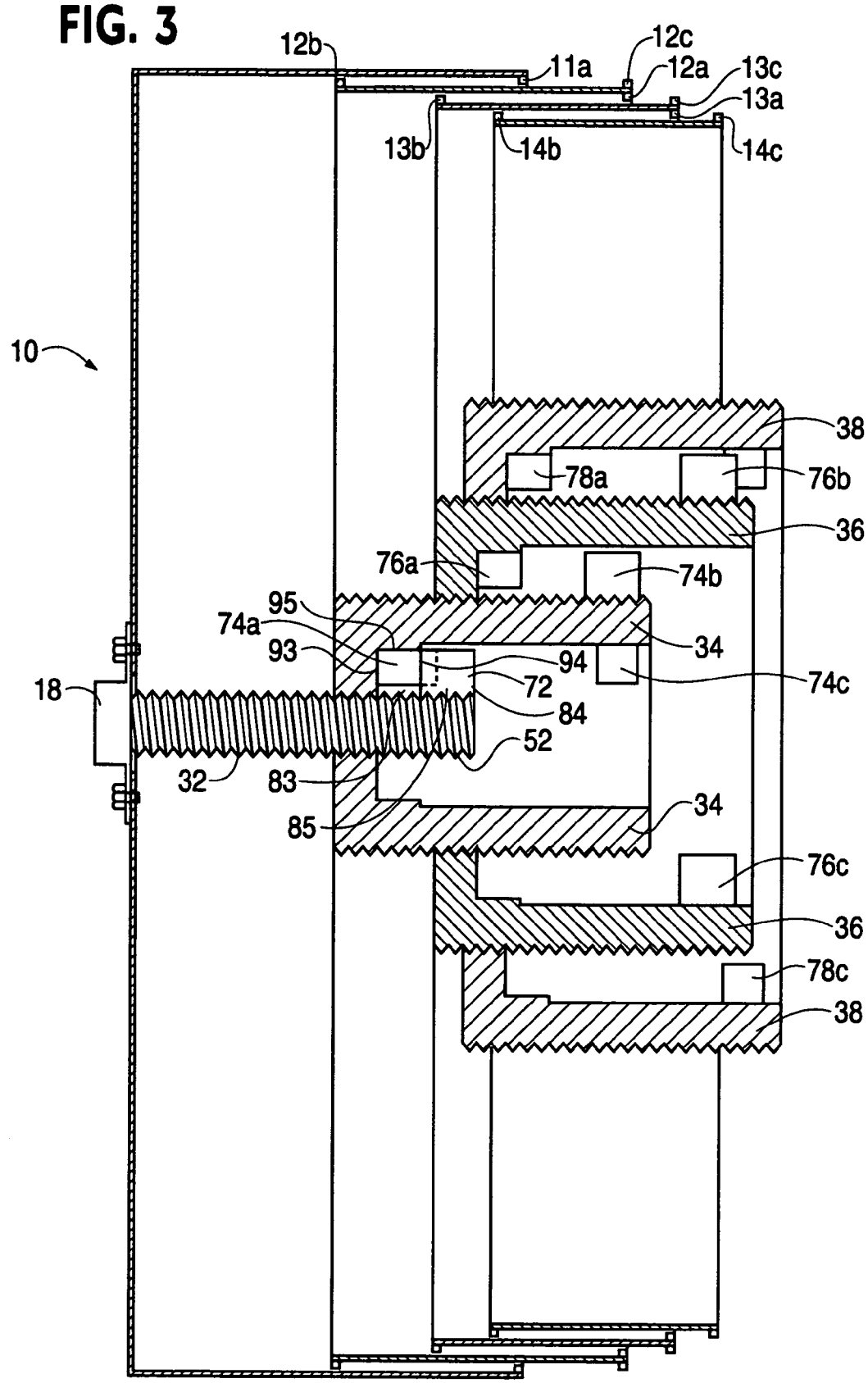
FIG. 3 is a longitudinal section of the embodiment of FIG. 1 in a partially expanded state.

The actuator 10 operates as follows. FIG. 2 shows the actuator 10 in a fully collapsed state. To begin the extension of the actuator, the lead screw 32 is rotated in the direction that will cause it to translate out from the segment 34 that it engages, thereby extending the length of the actuator 10. While the direction of the rotation depends upon whether the lead screw 32 is left-handed or right-handed, the type of screw thread is not critical to the invention and the invention can work with either. As the lead screw 32 rotates out of the actuator 10, stop cog 72, because it is attached to threads 52, rotates circumferentially with the screw 32 and travels toward stop cog 74a of screw segment 34. The actuator is designed so that stop cog 72 contacts stop cog 74a not on the longitudinal faces 83 and 94 respectively, but on the transverse faces 85 or 86 and 95 or 96 which are parallel to the axis of rotation of the screw 32. Whether transverse face 85 of stop cog 72 contacts transverse face 95 of stop cog 74a, or transverse face 86 of stop cog 72 contacts transverse face 96 of stop cog 74a depends on the direction of rotation of the lead screw 32. In either case, when lead screw 32 is rotated to its maximum extension, stop cog 72 contacts stop cog 74a. (See FIG. 3). The contact of stops cogs 72 and 74a is a simple surface to surface contact between transverse face 85 or 86 of stop cog 72 and one of the corresponding transverse faces 95 or 96 of stop cog 74a that does not require frictional force. This is illustrated in FIGS. 1 and 3 wherein stop cog 74a is shown partially in phantom since it is positioned behind stop cog 72. This simple surface to surface contact can be described as a tangential interference or a tangential contact. A frictional engagement between longitudinal faces 83 and 94 on the other hand can be referred to as an axial engagement or an interlocking engagement. Because frictional force is not involved in the tangential contact, disassociation of transverse and contacting stop cogs during collapse occurs by simple reversal of the screw rotation direction. That is, no unlocking force is required to overcome friction as it would be in an engagement of interlocking longitudinal faces.

After stop cog 72 of screw 32 has contacted stop cog 74a of screw 34, the continued rotation of lead screw 32 causes screw 34, which is engaged to screw 32 via threads 52 and threads 54a, to rotate with screw 32. As screw 32 and screw 34 rotate together, the outer threads 54b of screw 34 with pitch P2 rotate through the inner threads 56a of screw 36 which has pitch P2. As this happens, screw 32 and screw 34, now rotatably linked via stop cogs 72 and 74a, extend further out from the collapsed portion of the actuator 10. Screw 34 will continue to rotate and move along the threaded pathway until stop cog 74b of screw 34 engages stop cog 76a of screw 36. (See FIG. 1). At that point, the actuator 10 is now extended to a length that is substantially equal to the length of the screw segments 32, 34 and 36.

In similar fashion, if the rotation of segments 32 and 34 is continued, screw segment 36 will rotate in unison with segments 32 and 34, and stop cog 76b will approach stop cog 78a of screw segment 38. When stop cog 78a engages stop cog 76b, the actuator will be extended to a maximum length that is substantially equal to the sum of the lengths of segments 32, 34, 36, and 38. (See FIG. 1).

To reverse the process and collapse the actuator 10, the rotation of the screw segment 32 is reversed, which causes the screw 32 to travel back into (or onto) segment 34 until stop cog 72 of screw 32 tangentially engages stop cog 74c of screw 34. At that point, further rotational force applied to segment 32 will cause segment 34 to rotate back into segment 36 until stop cog 74b of screw 34 engages stop cog 76c of screw 36. This process is then continued until the actuator 10 has returned to its completely collapsed state. The rotation itself, whether to extend or collapse the actuator 10, can be initiated and sustained by several methods supplying rotary motion and torque including an electric motor drive or mechanical shaft power.

While the invention has been described in its preferred embodiment, it is to be understood that the words used are words of description rather than limitation and that changes may be made within the purview of the appended claims without departing from the true scope and spirit of the invention in its broader aspects.

The invention claimed:

1. A telescoping actuator comprising:
   a lead screw;
   a lead interference stop feature radially attached to said lead screw;
   a first tubular screw, said first tubular screw having inner threads; and
   a first interference stop feature radially attached to said inner threads of said first tubular screw;
   wherein said lead screw is threadably engaged to said first tubular screw;
   wherein upon rotation of said lead screw, said lead screw translates out from said first tubular screw;
   and further wherein said lead interference stop feature tangentially contacts said first interference stop feature, and further wherein upon contact of said lead interference stop feature and said first interference stop feature, said first tubular screw rotates in unison with said lead screw.

2. The telescoping actuator according to claim 1, further comprising a housing to enclose said actuator, said housing comprising a first and second segment, wherein said first segment and said second segment further comprise longitudinal limit stops, and wherein said first segment is rotatably keyed to said second segment, and further wherein said first segment of said housing translates relative to said second segment of said housing within said longitudinal limit stops, thereby preserving a limited portion of overlapping sleeved engagement between said first segment and said second segment.

3. The telescoping actuator according to claim 1, further comprising:
   a second tubular screw, said second tubular screw comprising inner threads;
   wherein said first tubular screw further comprises outer threads;
   a second tangential interference stop feature, said second tangential interference stop feature attached to said outer threads of said first tubular screw; and
   a third tangential interference stop feature, said third tangential interference stop feature attached to said inner threads of said second tubular screw;
   wherein said outer threads of said first tubular screw are threadably engaged with said inner threads of said second tubular screw;
   and further wherein said second tangential interference stop feature tangentially contacts said third tangential interference stop feature, thereby causing said second tubular screw to rotate in unison with said lead screw and said first tubular screw.

4. The telescoping actuator according to claim 1, wherein said telescoping actuator comprises a linear drive actuator converting rotary motion to linear motion.

5. The telescoping actuator according to claim 4, wherein said linear drive actuator comprises an antenna.

6. The telescoping actuator according to claim 1, wherein said telescoping actuator comprises a surgical device.

7. The telescoping actuator according to claim 1, wherein said threads of said lead screw extend along said lead screw for a distance that is less than the length of said lead screw.

8. The telescoping actuator according to claim 1, wherein said inner threads of said first tubular screw extend along said first tubular screw for a distance that is less than the length of said first tubular screw.

9. The telescoping actuator according to claim 1, wherein said lead tangential interference stop feature is positioned on said lead screw so that said lead screw does not translate substantially completely out of said first tubular screw.

10. The telescoping actuator according to claim 1, further comprising a grounding bracket coupled to said lead screw.

11. A telescoping actuator comprising:
   a lead tubular screw, said lead tubular screw comprising inner threads;
   a lead interference stop feature radially attached to said lead tubular screw;
   a second tubular screw, said second tubular screw comprising outer threads; and
   a first interference stop feature radially attached to said outer threads of said second tubular screw;
   wherein said lead tubular screw is threadably engaged to said second tubular screw;
   wherein upon rotation of said lead tubular screw, said lead tubular screw translates out from said second tubular screw;
   and further wherein said lead interference stop feature tangentially contacts said first interference stop feature, and further wherein upon contact of said lead interference stop feature and said first interference stop feature, said second tubular screw rotates in unison with said lead tubular screw.

12. The telescoping actuator according to claim 11, further comprising a housing to enclose said actuator, said housing comprising a first and second segment, said first and second segment comprising longitudinal limit stops, wherein said first segment is rotatably keyed to said second segment, and further wherein said first segment of said housing translates relative to said second segment of said housing within said longitudinal limit stops, thereby preserving a limited portion of overlapping sleeved engagement between said first segment and said second segment.

13. The telescoping actuator according to claim 11, further comprising:
   a third tubular screw, said third tubular screw comprising outer threads; wherein
   said second tubular screw further comprises inner threads;
   a second tangential interference stop feature, said second tangential interference stop feature attached to said inner threads of said second tubular screw; and
   a third tangential interference stop feature, said third tangential interference stop feature attached to said outer threads of said third tubular screw;
   wherein said inner threads of said second tubular screw arc threadably engaged with said outer threads of said third tubular screw;
   and further wherein said second tangential interference stop feature tangentially contacts said third tangential interference stop feature, thereby causing said third tubular screw to rotate in unison with said lead tubular screw and said second tubular screw.

14. The telescoping actuator according to claim 11, wherein said telescoping actuator comprises a linear drive actuator convening rotary motion to linear motion.

15. The telescoping actuator according to claim 14, wherein said linear drive actuator comprises an antenna.

16. The telescoping actuator according to claim 11, wherein said telescoping actuator comprises a surgical device.

17. The telescoping actuator according to claim 11, wherein said threads of said lead tubular screw extend along said lead tubular screw for a distance that is less than the length of said lead tubular screw.

18. The telescoping actuator according to claim 11, wherein said outer threads of said second tubular screw extend along said second tubular screw for a distance that is less than the length of said second tubular screw.

19. The telescoping actuator according to claim 11, wherein said lead tangential interference stop feature is positioned on said lead tubular screw so that said lead tubular screw does not translate substantially completely off of said second tubular screw.

20. A telescoping actuator comprising:
   a lead screw;
   one or more concentric screws; and
   one or more interference stop features;
   wherein rotation of said lead screw causes said lead screw to translate out of or off of said concentric screws, said extension occurring until a first interference stop feature radially positioned on said lead screw tangentially contacts a second interference stop feature radially positioned on a first concentric screw; and wherein upon said tangential contact of said first interference stop feature and said second interference stop feature, further rotation of said lead screw causes said first concentric screw to rotate in unison with said lead screw, thereby forming a tier between said lead screw and said first concentric screw.

21. A telescopic actuator comprising:

a lead screw;

a lead interference stop feature radially attached to said lead screw;

a first screw; and a first interference stop feature radially attached to said first screw;

wherein said lead screw is threadably engaged to said first screw;

wherein upon rotation of said lead screw, said lead screw translates away from said first screw;

and further wherein said lead interference stop feature tangentially contacts said first interference stop feature, and further wherein upon tangential contact of said lead interference stop feature and said first interference stop feature, said first screw rotates in unison with said lead screw.

* * * * *